2,922,659

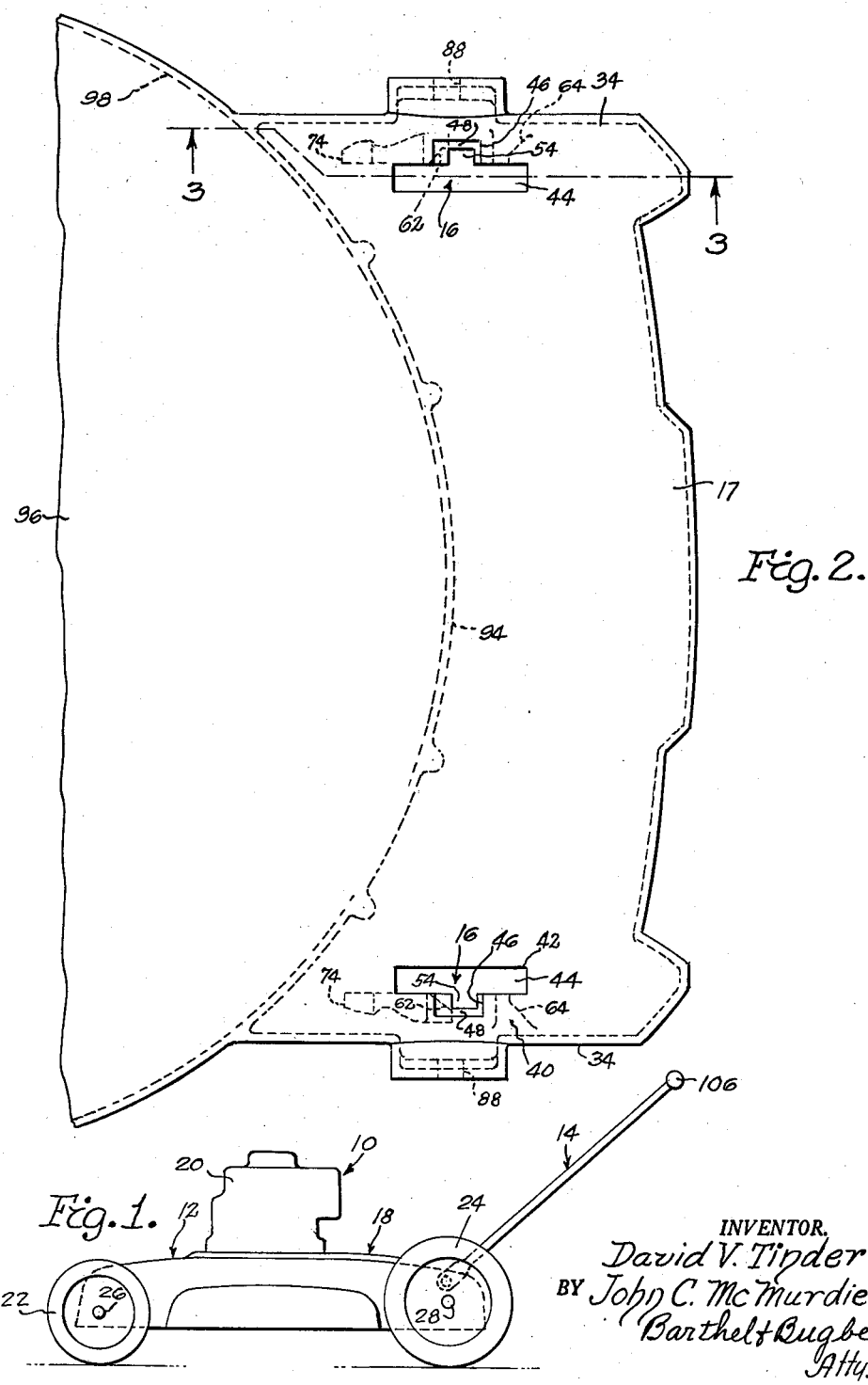

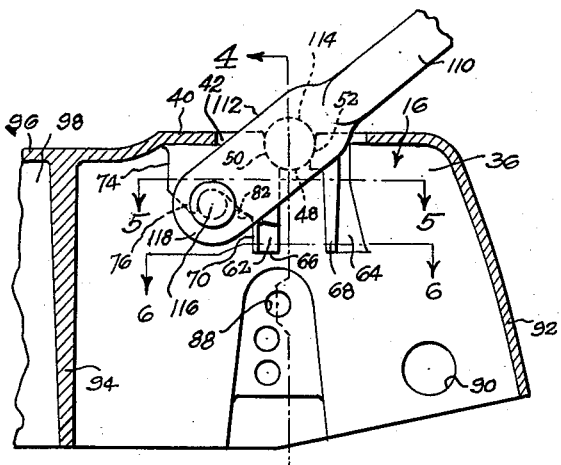
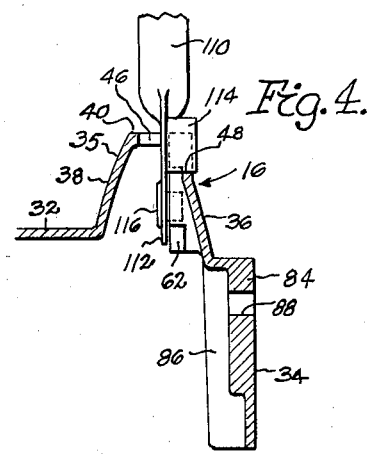
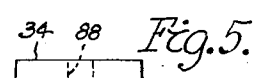
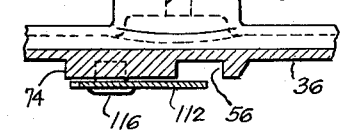
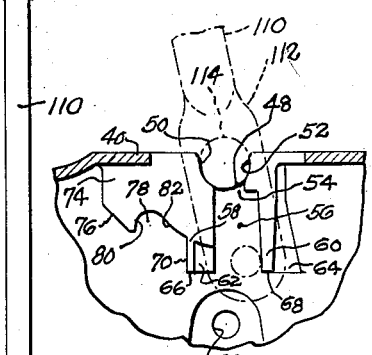
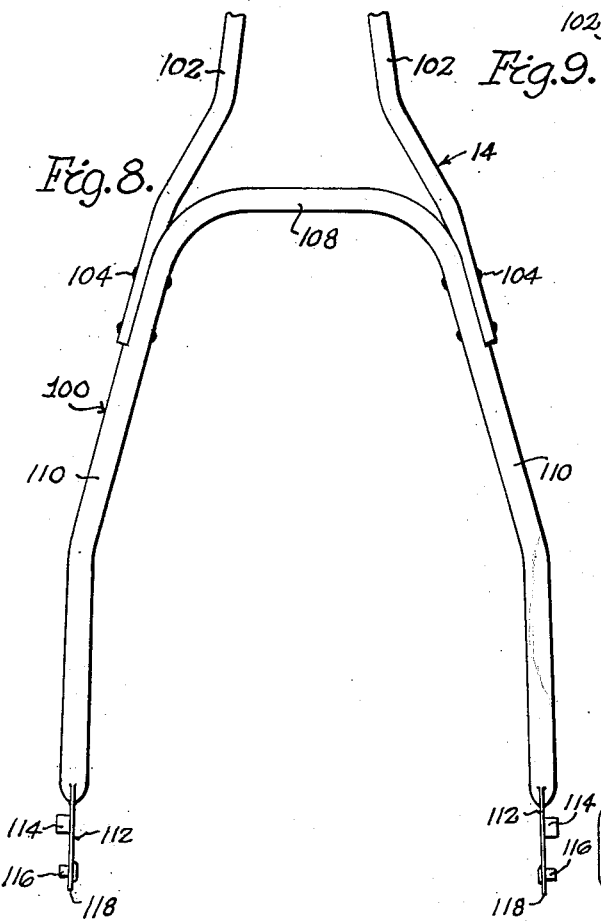
INVENTOR.
David V. Tinder
John C. McMurdie
BY Barthel + Bugbee
Attys

United States Patent Office 2,922,659
Patented Jan. 26, 1960

DETACHABLE HANDLE CONSTRUCTION FOR LAWNMOWERS

David V. Tinder, Oak Park, Mich., and John C. McMurdie, Riverside, Ontario, Canada, assignors, by mesne assignments, to Moto-Mower, Inc., a corporation of Delaware Application July 26, 1957, Serial No. 674,380

4 Claims. (Cl. 280—47.37)

This invention relates to lawnmowers and other similar wheeled handle-equipped machines and, in particular, to the handle construction thereof.

One object of this invention is to provide a detachable handle mounting construction for rollable wheeled machines wherein the handle unit is constructed as a separate and detachable unit from mounts in the machine chassis for ease of transportation and storage yet which is quickly and easily installed in the machine chassis or removed therefrom without the need for any tools and without requiring any fasteners which might become loose or lost.

Another object is to provide a detachable handle mounting construction for rollable wheeled machines of the foregoing character wherein the handle unit has a yoke portion with resilient arms which are sprung into a deformed position in inserting the ends of the arms into seats in chassis mounts aided by cam ramps associated with the seats, snapping back into their permanent positions in the chassis beyond the zones of influence of the cam ramps.

Another object is to provide a detachable handle mounting construction for rollable wheeled machines of the foregoing character wherein the installed handle is free-acting within precisely-located opposite limiting stops which on the one hand prevent the handle from falling down and on the other hand prevent the handle from being capable of being pushed so far upward that the toes of the operator's feet can get under the machine and be cut by the rotary cutting blades thereof.

Another object is to provide a detachable handle mounting construction for rollable wheeled machines of the foregoing character wherein the handle, when once installed in its chassis mounts cannot be accidentally removed or shifted from the operating position, thereby preventing the accidents which have occurred, particularly in self-propelled machines, such as motor-driven lawnmowers, wherein the accidental detachment of the handle has enabled the machine to run away from the operator and out of his control.

Another object is to provide a detachable handle mounting construction for rollable wheeled machines of the foregoing character, wherein the handle can be optionally shifted to an upright position for ease of storage and wherein by an intended action the yoke arms of the handle in its installed or operating position can be sprung together manually toward one another so as to unseat the pivot lugs thereof from their respective pivotal recesses in the chassis mounts whereby the handle may then be either removed entirely or swung upward to an upright storage position, yet as the handle is swung backward into an operating position its pivot lugs snap back into their respective pivotal recesses against shoulders on their cam ramps after passing over these cam ramps.

Other objects and advantages of the invention will become apparent during the course of the following description of the accompanying drawings, wherein:

Figure 1 is a side elevation on a reduced scale of a rollable wheeled machine having a chassis equipped with a detachable handle construction according to one form of the invention;

Figure 2 is an enlarged fragmentary top plan view of the wheeled machine of Figure 1, showing the handle mounts in the rearward end of the chassis thereof;

Figure 3 is a further enlarged fragmentary vertical section through one of the chassis handle mounts taken along the line 3—3 in Figure 2, with the end of one arm of the handle installed in its operating position;

Figure 4 is a vertical section taken along the line 4—4 in Figure 3 in a plane at right angles to the section plane of Figure 3;

Figure 5 is a horizontal section taken along the line 5—5 in Figure 3;

Figure 6 is a horizontal section taken along the line 6—6 in Figure 3; showing the cam ramps of one of the handle mounts in the chassis;

Figure 7 is a view similar to Figure 3, but showing the lower end of one of the yoke arms sprung outward and upward beyond its operating position, into an approximately vertical position for storage or outright removal of the handle;

Figure 8 is a front elevation of the lower part of the handle shown in Figure 1, upon an enlarged scale, showing the pivot lugs and stop lugs on the lower ends of the handle yoke arms; and Figure 9 is a side elevation of the handle portion shown in Figure 8.

Hitherto, handles for rollable wheeled machines, such as power lawnmowers, power sweepers, and the like, have ordinarily been installed permanently in their respective machines by means of conventional fasteners, such as bolts or screws. These fasteners, however, have been subject to becoming loosened and lost as a result of the vibration set up in the machine, with the result that the machine is rendered useless temporarily until a new fastener can be found. Moreover, the loss of such a fastener raises the possible danger of the machine running out of control of the operator, particularly if the machine is self-propelled, and this danger is especially serious if both fasteners become loosened and detached. Moreover, when such fasteners are used, it is dangerous to the operator when the handle swings upward to a vertical position, allowing the machine to roll backward over his toes or permitting him accidentally to insert the toes of his shoes under the machine and into the zone of action of the cutting blades, with the result that his shoes and possibly also his toes are cut and injured by the rapidly-rotating cutting blades. Furthermore, the prior handle constructions, where providing stops to prevent accidental and dangerous shifting of the handle to an upright position, at the same time prevent an intended shifting of the handle to an upright position for storage purposes. Installation of such prior handles by means of fasteners has also been complicated, and has required the use of special tools.

The detachable handle construction of the present invention provides a handle unit which fits into a pair of mounts in the machine chassis without requiring any special tools or fasteners and providing stops which limit the swinging of the handle to a safe range of swing in the operating position, yet which permits the handle, by an intended manual deformation of the arms of its yoke portion, to be shifted into an upright storage position without the danger of being accidentally swung into that upright position during operation of the machine. Moreover, the detachable handle mounting construction of the present invention also provides for easy insertion of the handle yoke portion into the pair of mounts in the machine chassis merely by springing the lower ends of the arms thereof toward one another so as to permit their insertion into the apertures above the mounts, whereupon cam ramps built into the mounts enable the handle to be swung into its operating position against abutment stops which prevent its accidental removal, yet permit free swinging of the handle within a safe range of swing in an upward and downward direction.

Referring to the drawings in detail, Figure 1 shows a rollable wheeled machine generally designated 10, here shown for convenience as a power lawnmower, having a chassis 12 equipped with a detachable handle 14, the lower ends of which are insertable into laterally-spaced mounts 16 (Figure 2) in the rearward end portion 17 of the hollow chassis housing 18. The machine 10 is shown as equipped with an internal combustion engine 20 which drives a rotary-bladed cutter (not shown) located beneath the chassis 12 and arranged to cut the grass or weeds as the chassis 12 is rolled over the lawn on its front and rear wheels 22 and 24 respectively on their respective axles 26 and 28. The cutting portion of the machine 10 and its wheeled supporting construction are conventional and their details are beyond the scope of the present invention.

The various portions of the handle mounts 16 are preferably cast integral with the top wall 32 and side wall 34 of the chassis housing 18. For this purpose, the top wall 32 is provided with hollow elongated upstanding portions 35 having outer and inner walls 36 and 38 (Figure 4) which converge upwardly toward a top portion 40 provided with an elongated slot 42 having opposite ends 44. Beside each slot 42 and communicating therewith is a shorter outwardly-directed arcuate pivot recess or seat 46 (Figure 2) formed in the upper edge of the outer wall 36 of the upstanding portion 34 and having a central arcuate bridge portion 48 (Figure 4) interconnecting spaced arcuate bearing portions 50 and 52 which extend laterally inward, where they are separated from one another by a gap 54. The gap 54 leads into a downwardly-extending passageway 56 between forward and rearward cam bosses or lugs 58 and 60 extending inwardly from the side wall 36 and having forwardly-inclined cam ramps 62 and 64 respectively (Figure 6) terminating in summits or ridges 66 and 68 beyond which are abutment surfaces or stop shoulders 70 and 72 disposed substantially perpendicular to the outer wall 36.

The forward cam portion 58 is integral with an inwardly-extending boss 74 (Figure 7) which has a lower edge 76 inclined downwardly toward the cam boss 58 and terminating at a recess 78 having an arcuate upper stop shoulder 80 and an arcuate retaining or abutment shoulder 82 concentric with said pivot seat 46 and leading downward to the stop portion 70 in such a manner that the upper stop shoulder 80 is spaced upward and forward from the lower stop shoulder 70 so as to limit the swinging range of the handle 14 as described more fully below. The housing side wall 34 below the outer wall 36 of each upstanding portion 38 is provided with a thickened part 84 with an internal approximately U-shaped recess 86 containing a series of vertically-spaced fastener holes 88 (Figure 3) for providing a cutting height adjustment forming no part of the present invention. Located rearwardly of the holes 88 in each of the opposite side walls 34 is an axle hole 90 for the rear axle 28 of the machine 10. A downwardly-directed rear wall 92 is spaced rearwardly of an arcuate partition 94 which separates the rearward housing portion 17 from the central portion 96 thereof containing the cylindrical cutting blade chamber 98.

The handle 14 consists of a lower approximately U-shaped yoke member 100 of resilient material such as steel (or, to a lesser extent, aluminum) and laterally-spaced parallel side members 102 riveted or otherwise secured thereto as at 104 and secured to and interconnected at their upper ends by a handle bar 106 (Figure 1). The yoke member 100 and side members 102 are preferably formed from tubular metal stock, and the yoke member 100 has a central bridge portion 108 from which arm portions 110 extend downwardly into flattened end portions 112 formed by pressing the ends of the arm portions 110. The end portions 112 diverge slightly relatively to one another and are separated from one another by a slightly greater distance than the separation of the slots 42 of the chassis housing 18, so that when sprung together into the mounts 16, the end portions 112 will be deformed into substantial parallelism. The end portions 112 have aligned outwardly-extending upper cylindrical lugs 114 (Figures 8 and 9) and lower headed stop or retaining lugs 116 of smaller diameter than the upper lugs 114 and projecting through holes in the end portions 112. The lugs 114 and 116 are secured in any suitable way, such as by welding, to the end portions 112.

In the operation of the invention, let it be assumed that the handle 14 is separate and detached from the chassis 12, such as is the case when it is being taken out of the shipping crate. To install the handle 14, the operator grasps the arm portions 110 of the yoke member 100 of the handle 14 (Figure 8) in one hand, with the hands placed immediately above the flattened end portions 112. He then aligns the lower ends 118 of the flattened portions 112 with the slots 42 so that the lugs 114 and 116 are positioned immediately above the recesses 46. He then pulls the arm portions 110 toward one another so as to bring the flattened end portions 112 into approximate parallelism, the resilient metal or other material of which the yoke member 100 is made permitting such deformation and enabling the lower ends 118 and the end portions 112 with their lugs 114 and 116 to be slid downward into the passageway 56 between the cam portions 58 and 60 (Figure 7).

When the upper or pivot lugs 114 come into contact with the arcuate portions 50 and 52 of the pivot seats 48, the operator releases the arms 110, which spring outward. The operator now swings the handle bar 106 rearwardly and downwardly to swing the arm portions 110 of the yoke member 100 downwardly and rearwardly around the pivot lugs 114 in their pivot seats 48. When this occurs, the lower or stop lugs 116 engage and climb the cam ramps 62, pass over the summits 66 of the cam portions 58 and drop into the arcuate recesses 78 (Figures 3 and 7) immediately forward of the stop shoulders 70 and beneath the abutment shoulders 82. At the same time, the yoke end portions 112, which temporarily had been urged toward one another by the cam ramps 62, spring outward into substantial parallelism with one another. Accordingly, the handle 14 can now be swung upward or downward between limits established by the spaced stop shoulders 70 and 80 in the lower edges 76 of the bosses 74. The stop shoulders 70 prevent the handle 14 from being accidentally swung upward into a vertical position and thus prevent the accidental cutting of the operator's shoes or toes by their slipping beneath the rearward housing portion 17 into the blade chamber 98. At the same time, the engagement of the lower lugs 116 with the abutment shoulders 82 prevents accidental withdrawal of the handle 14 from its mounts 16.

To swing the handle 14 intentionally into an upright position for storage or outright removal, the operator grasps the lower portions of the side arms 110 of the yoke member 100 as before and pulls them toward one another so as to enable the ends of the stop lugs 116 to pass over the summits 66 of the forward cam portions 58 and slide along the cam ramps 62 into the passageways 56, as shown in Figure 7, whereupon the handle 14 reaches an upright position and may be left in that position for storage or removed from the mounts 16 by reversing the installation procedure described above.

What we claim is:
1. A detachable handle-mounting construction for a rollable wheeled machine with a handle-guided chassis, said construction comprising a pair of laterally-spaced handle mounts on said chassis each having a pivot bearing seat therein and a retaining shoulder disposed below said seat, and a handle structure having a hand-gripping portion at one extremity thereof and a pair of laterally-spaced resilient arms at the other extremity thereof having ends spaced a distance apart different from the distance between said retaining shoulders of said mounts in the relaxed condition of said arms, each of said ends having a laterally-projecting pivot element fitting into its corresponding bearing seat and having a laterally-projecting retaining element disposed thereon at substantially the same distance below said pivot element as the distance of said retaining shoulder below said bearing seat of said mount, said retaining elements being disposed beneath said retaining shoulders in retained engagement therewith, said ends of said arms being springable relatively to one another into positions disengaging said retaining elements from said retaining shoulders whereby to effect rapid insertion and removal of said handle structure, each of said retaining elements being narrower than its corresponding pivot element and each of said bearing seats having a cutaway portion therethrough adapted to pass its respective retaining element.

2. A detachable handle-mounting construction for a rollable wheeled machine with a handle-guided chassis, said construction comprising a pair of laterally-spaced handle mounts on said chassis each having a pivot bearing seat therein and a retaining shoulder disposed below said seat, and a handle structure having a hand-gripping portion at one extremity thereof and a pair of laterally-spaced resilient arms at the other extremity thereof having ends spaced a distance apart different from the distance between said retaining shoulders of said mounts in the relaxed condition of said arms, each of said ends having a laterally-projecting pivot element fitting into its corresponding bearing seat and having a laterally-projecting retaining element disposed thereon at substantially the same distance below said pivot element as the distance of said retaining shoulder below said bearing seat of said mount, said retaining elements being disposed beneath said retaining shoulders in retained engagement therewith, said ends of said arms being springable relatively to one another into positions disengaging said retaining elements from said retaining shoulders whereby to effect rapid insertion and removal of said handle structure, a handle-swing-limiting stop being disposed at one end of each of said retaining shoulders and said stop having a cam ramp on one side thereof leading thereover toward its respective retaining shoulder.

3. A detachable handle-mounting construction for a rollable wheeled machine with a handle-guided chassis, said construction comprising a pair of laterally-spaced handle mounts on said chassis each having a pivot bearing seat therein and a retaining shoulder disposed below said seat, and a handle structure having a hand-gripping portion at one extremity thereof and a pair of laterally-spaced resilient arms at the other extremity thereof having ends spaced a distance apart different from the distance between said retaining shoulders of said mounts in the relaxed condition of said arms, each of said ends having a laterally-projecting pivot element fitting into its corresponding bearing seat and having a laterally-projecting retaining element disposed thereon at substantially the same distance below said pivot element as the distance of said retaining shoulder below said bearing seat of said mount, said retaining elements being disposed beneath said retaining shoulders in retained engagement therewith, said ends of said arms being springable relatively to one another into positions disengaging said retaining elements from said retaining shoulders whereby to effect rapid insertion and removal of said handle structure, a handle-swing-limiting stop being disposed at one end of each of said retaining shoulders and said stop having a cam ramp on one side thereof leading thereover toward its respective retaining shoulder, each of the bearing seats being provided with a passageway of greater width than its respective retaining element leading downward to its corresponding cam ramp.

4. A detachable handle-mounting construction for a rollable wheeled machine with a handle-guided chassis, said construction comprising a pair of laterally-spaced handle mounts on said chassis each having a pivot bearing seat therein and a retaining shoulder disposed below said seat, and a handle structure having a hand-gripping portion at one extremity thereof and a pair of laterally-spaced resilient arms at the other extremity thereof having ends spaced a distance apart different from the distance between said retaining shoulders of said mounts in the relaxed condition of said arms, each of said ends having a laterally-projecting pivot element fitting into its corresponding bearing seat and having a laterally-projecting retaining element disposed thereon at substantially the same distance below said pivot element as the distance of said retaining shoulder below said bearing seat of said mount, said retaining elements being disposed beneath said retaining shoulders in retained engagement therewith, said ends of said arms being springable relatively to one another into positions disengaging said retaining elements from said retaining shoulders whereby to effect rapid insertion and removal of said handle structure, a handle-swing-limiting stop being disposed at one end of each of said retaining shoulders and said stop having a cam ramp on one side thereof leading thereover toward its respective retaining shoulder, each of the bearing seats being provided with a passageway of greater width than its respective retaining element leading downward to its corresponding cam ramp, each of said passageways having a shouldered side wall on the opposite side thereof from said last-mentioned stop and each of said shouldered side walls also having a cam ramp on one side thereof leading thereover toward its respective passageway.

References Cited in the file of this patent

UNITED STATES PATENTS

| | | |
|---|---|---|
| 2,305,138 | Clemson | Dec. 15, 1942 |
| 2,709,882 | Abel | June 7, 1955 |
| 2,716,559 | Boyce | Aug. 30, 1955 |
| 2,724,598 | Knarzer | Nov. 22, 1955 |
| 2,757,013 | Brier | July 31, 1956 |